United States Patent
Wu et al.

(10) Patent No.: US 8,080,596 B2
(45) Date of Patent: Dec. 20, 2011

(54) BIODEGRADABLE PLASTIC MATERIAL AND METHOD FOR PRODUCING THE SAME

(75) Inventors: Shu-Yii Wu, Taichung (TW); Shih-Chien Chu, Taichung (TW); Ting-Yu Lee, Taichung (TW); Ming-Lei Wang, Taichung (TW); Chao-Wei Lin, Taichung (TW)

(73) Assignees: Pou Chien Technology Co., Ltd., Taichung (TW); Feng Chia University, Taichung (TW)

( * ) Notice: Subject to any disclaimer, the term of this patent is extended or adjusted under 35 U.S.C. 154(b) by 429 days.

(21) Appl. No.: 12/350,537

(22) Filed: Jan. 8, 2009

(65) Prior Publication Data

US 2010/0174004 A1 Jul. 8, 2010

(30) Foreign Application Priority Data

May 16, 2008 (TW) .................................. 9711821 A

(51) Int. Cl.
*C08L 3/06* (2006.01)
*B27M 3/20* (2006.01)
*C08K 5/00* (2006.01)

(52) U.S. Cl. ............. 524/47; 428/35.6; 521/50; 521/82; 521/84.1; 523/128

(58) Field of Classification Search ................... 521/50, 521/82, 84.1; 36/25 R; 428/35.6; 523/128; 524/47
See application file for complete search history.

(56) References Cited

U.S. PATENT DOCUMENTS 3,355,322 A * 11/1967 Worrall et al. ................ 428/514
2010/0237527 A1 * 9/2010 Wu et al. ...................... 264/45.4

FOREIGN PATENT DOCUMENTS

WO  WO 2005023873 A1 * 3/2005

* cited by examiner

*Primary Examiner* — Timothy J. Kugel
(74) *Attorney, Agent, or Firm* — Frommer Lawrence & Haug LLP; Ronald R. Santucci

(57) ABSTRACT

A method for producing a biodegradable plastic material includes: hydrolyzing starch to form a hydrolyzed starch; esterifying the hydrolyzed starch to form a hydrolyzed and esterified starch; drying the hydrolyzed and esterified starch to obtain a dried modified starch; and mixing the dried modified starch with a plastic material, such as an EVA copolymer.

19 Claims, 3 Drawing Sheets

BIODEGRADABLE PLASTIC MATERIAL AND METHOD FOR PRODUCING THE SAME

This application claims priority of Taiwanese Application No. 097118121 filed May 16, 2008, the disclosure of which is incorporated herein by reference.

BACKGROUND OF THE INVENTION

1. Field of the Invention

The invention relates to a biodegradable material, more particularly to a biodegradable plastic material and a manufacturing method thereof.

2. Description of the Related Art

Nowadays, chemically synthetic plastic products, which are mainly made of petrochemical raw material, are widely used, for example in daily needs for food, clothing, living, or transportation. Nevertheless, with the rapid industrial development in developing countries, the need for various petrochemical raw materials has increased, arising in an increase of petroleum price together with their production and manufacturing costs. Therefore, the related industrial sectors are always in search of highly efficient and low costing manufacturing processes of plastic products.

Besides, ordinary chemically synthetic plastic materials are inherently stable and do not degrade easily under the natural environment, thereby resulting in serious environmental pollution. Developing biologically compatible and degradable plastic materials, such as plastic-like materials that are able to be decomposed into $CO_2$ and $H_2O$ by microbes under the natural landfill environment, has therefore become a global trend. Three types of such plastics have been developed: photodegradable plastics, biodegradable plastics, and the disintegradable plastics.

The photodegradable plastics are degradable by UV solar energy, which induces chain reactions promoted by photosensitive agents in the plastic and breaks chemical bonding between the polymers of the plastic. However, most waste plastic products are either buried or sunk under water, which prevents any efficient degradation by solar energy.

Besides, the biodegradable plastics use natural polymers or aliphatic polyesters as a matrix, and a material such as starch, fiber, protein, or polylactic acid (PLA). Nevertheless, the high prices and poor strengths of such polymers restrict their applications.

The disintegradable plastics are made by mixing conventional plastic materials with starch or biologically fermented substances which are decomposable by microbes ubiquitous in the natural environment. The plastics are then disintegrated, thereby reducing the overall garbage together with the amount of petroleum raw material and the cost of manufacturing process.

Ethylene vinyl acetate (abbreviated as EVA) copolymer is a main raw material commonly used in shoe material, and is derived from the by products of the petroleum industry. Like other plastic materials, EVA materials face the problems of increasing cost of petrochemical oil price, non-degradability and environmental pollution at the end of its life cycle.

A manufacturing method of biodegradable plastic material is disclosed in ROC application no. 93118611 Taiwan patent no. 1248957). According to this method, starch is first dehydrated between 160° C. and 170° C. and ground into granules each having a size smaller than 10 µm, and then mixed and stirred with a biodegradable plastic raw material and a conventional chemically synthetic plastic raw material in order to form the biodegradable plastics.

According to another method disclosed in ROC application no. 88105965 Taiwan patent no. 400358), a biodegradable EVA foam is made using EVA as a matrix which is mixed with biodegradable components, such as cereal shell powder, wood saw dust, or starch, such as unprocessed corn starch.

ROC application Nos. 79105530, 79105777 and 79105778 Taiwan patent nos. 191226, 192556 and 191227, respectively) suggest to heat starch and plastic raw materials for a sufficient time period in an enclosed chamber and under adequate temperature and pressure so as to decompose the starch and form a homogenous melt for manufacture of plastic products.

Nevertheless, the biodegradable materials and the plastic raw materials are poorly compatible and provide weak resultant bonding strength therebetween. Therefore, the proportion of the biodegradable material in admixture with the plastic material is low. If the proportion of the biodegradable material is increased, the structural strength of the product can decrease, thereby limiting the application of the resultant product. For example, such materials are not suitable for use in plastic articles that require durability, for example, shoe soles prone to frequent wearing.

Besides, although the methods disclosed in ROC application nos. 79105530, 79105777 and 79105778 (Taiwan patent nos. 191226, 192556 and 191227, respectively) are able to increase the proportion of starch in the overall manufacturing materials, increasing temperature and pressure during the manufacturing process inherently increases the cost of energy supply and lengthens manufacturing time, which result in poor manufacturing efficiency and higher manufacturing costs.

Moreover, the foregoing disclosures of biodegradable materials are not suitable for use as shoe materials as their structural strengths do not comply with the standards for shoes.

SUMMARY OF THE INVENTION

Therefore, the main object of the present invention is to provide a method for producing a biodegradable plastic material that has a lower manufacturing cost, that is biodegradable or disintegradable, and that has good structural strength.

Accordingly, there is provided a method for producing a biodegradable plastic material. The method comprises:
(i) hydrolyzing starch to form a hydrolyzed starch;
(ii) esterifying the hydrolyzed starch to form a hydrolyzed and esterified starch;
(iii) drying the hydrolyzed and esterified starch to obtain a dried modified starch; and
(iv) mixing the dried modified starch with a plastic material.

The modified starch has an increased contact surface area that enhances bondability with the plastic material when the modified starch and the plastic material are mixed, thereby improving compatibility between the modified starch and the plastic material. Furthermore, the proportion of starch in the biodegradable plastic material can be increased without decreasing the structural strength, and the manufacturing costs can be effectively lowered. The method of this invention therefore provides a biodegradable plastic material that has a predetermined structural strength complying with the standards for shoe materials, and that is biodegradable or disintegradable.

Preferably, the plastic material includes an ethylene vinyl acetate copolymer.

The hydrolyzed starch has a number average molecular weight ranging from $10^4$ to $10^7$.

An inorganic acid is used to hydrolyze the starch, and an alkaline solution is used to terminate the hydrolysis of the starch so that the hydrolyzed starch has a predetermined average molecular weight. Preferably, the inorganic acid is selected from the group consisting of hydrochloric acid, nitric acid, sulfuric acid and phosphoric acid.

An esterifying agent selected from the group consisting of an organic acid, an acid anhydride, and phosphoric acid is used in the esterification of the hydrolyzed starch.

Preferably, acetic anhydride is used in the esterification of the hydrolyzed starch.

The degree of ester substitution of the hydrolyzed and esterified starch ranges from 0.5 to 3, more preferably from 0.5 to 1.5.

The hydrolyzed and esterified starch is dried by spray drying, the dried modified starch has a particle size ranging from 10 μm to 50 μm, and the dried modified starch has a moisture content of 2% to 8% by weight.

According to one embodiment, 20 to 30 weight parts of the dried modified starch is mixed with 60 to 75 weight parts of the plastic material and 14 to 40 weight parts of an additive component to form a blend.

This invention also provides a biodegradable plastic material which comprises a modified starch and a plastic material, the modified starch being produced by:
(i) hydrolyzing starch to form a hydrolyzed starch;
(ii) esterifying the hydrolyzed starch to form a hydrolyzed and esterified starch; and
(iii) drying the hydrolyzed and esterified starch to obtain the modified starch.

Preferably, the plastic material is an ethylene vinyl acetate copolymer, and the biodegradable plastic material further comprises an additive component, the additive component including a filler, a crosslinking agent, a foaming agent, a processing aid and a foaming aid.

The biodegradable plastic material according to this invention is biodegradable, and provides a predetermined structural strength that complies with the standards for shoe materials without increasing the manufacturing costs, since the modified and esterified starch has a better compatibility with the plastic material.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
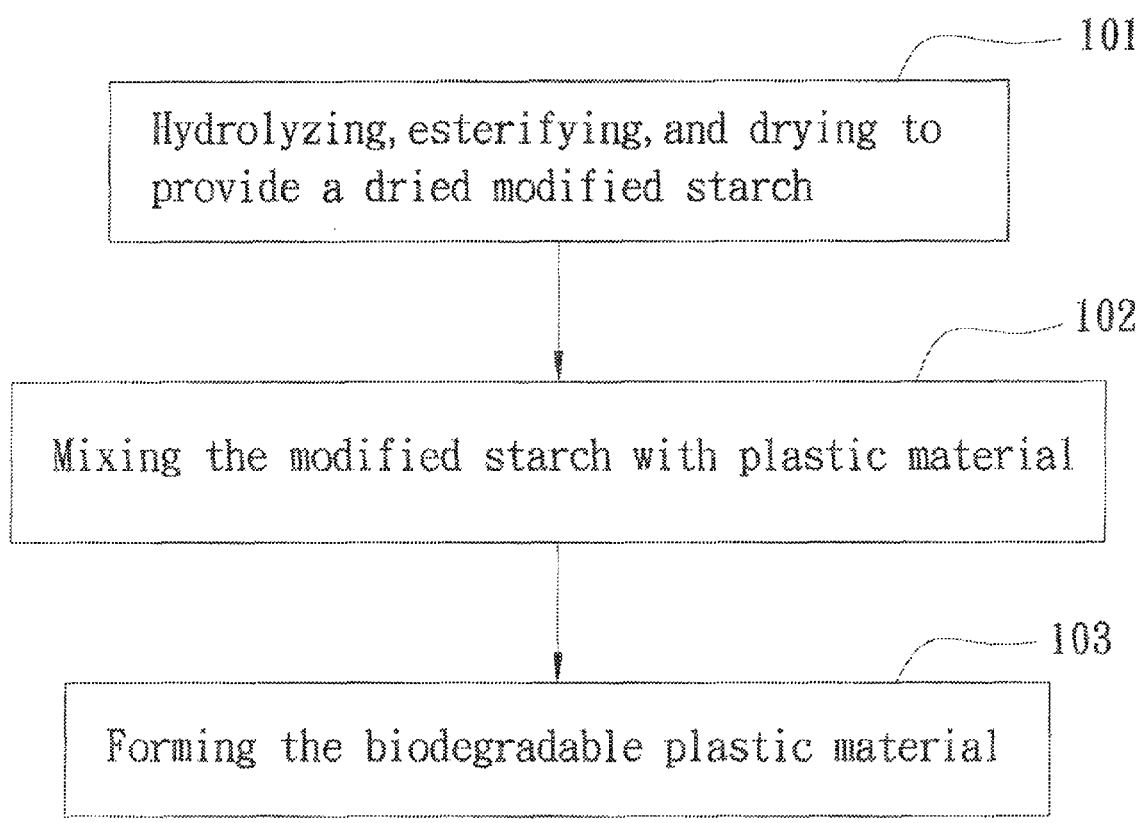
FIG. 1 is a flow chart showing a preferred embodiment of the method for producing a biodegradable plastic material according to the present invention.

Referring to FIG. 1, the preferred embodiment of the method for producing a biodegradable plastic material according to the invention comprises a first step 101, wherein a predetermined amount of raw starch is hydrolyzed to form a hydrolyzed starch having a predetermined number average molecular weight. The hydrolyzed starch is then esterified to form a hydrolyzed and esterified starch, and dried by spray drying to obtain a dried modified starch having multiple pores and low moisture content.

In an embodiment, the raw starch is hydrolyzed using an inorganic solution that preferably has a normality concentration of 0.5N~2N and that is selected from the group consisting of hydrochloric acid, nitric acid, sulfuric acid, and phosphoric acid. The hydrolysis reaction temperature is preferably 40° C.~55° C. Through the hydrolysis reaction, the raw starch having large molecular weight (e.g., a number average molecular weight larger than $10^8$) is converted into the hydrolyzed starch having small molecular weight (e.g., a number average molecular weight ranging from $10^4$ to $10^7$).

The time for the hydrolysis reaction is controlled to be 30~120 minutes. After a predetermined period, an alkaline solution is used to terminate the hydrolysis reaction so that the hydrolyzed starch is provided with a predetermined range of molecular weight. Thereafter, the hydrolyzed starch is precipitated out from the reaction solution, and the resulting starch precipitate is washed with water, and formed into a slurry for esterification. Preferably, the concentration of the hydrolyzed starch in the slurry is adjusted to 40% w/w.

Figure 2:
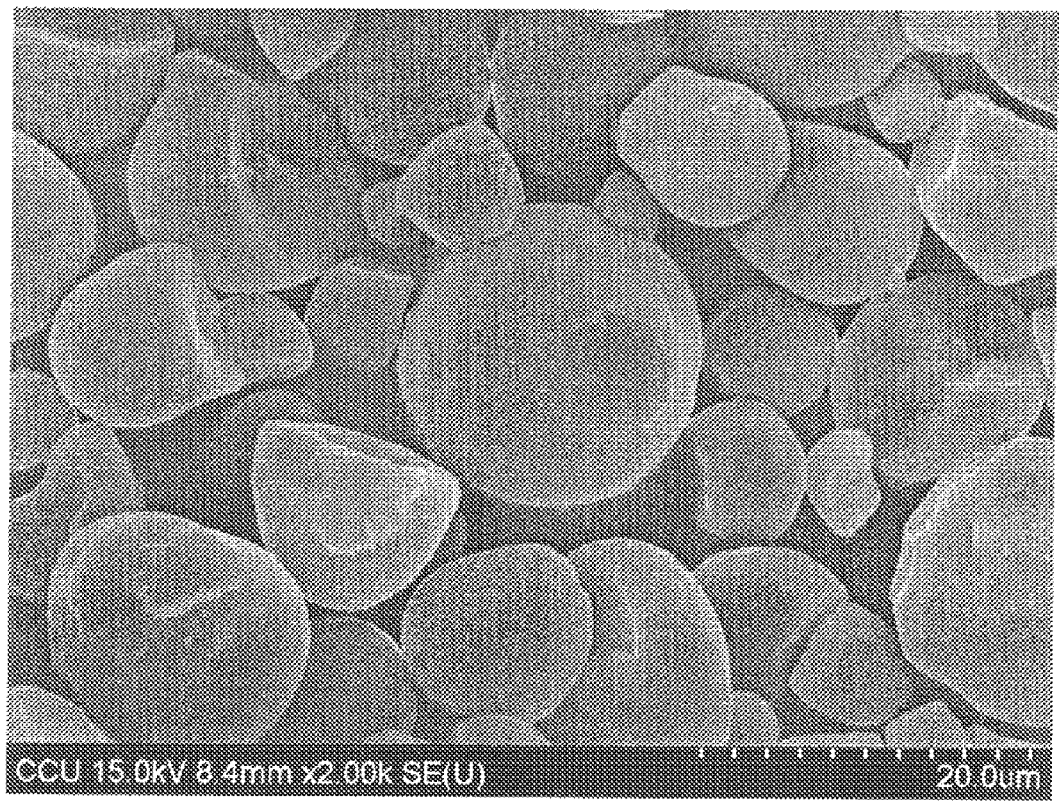
FIG. 2 is a scanning electron microscope image of raw starch.

As shown in the scanning electron microscope image of FIG. 2, the raw starch has a compact structure with a global shape and smooth surfaces, which is hardly compatible with the plastic material.

Figure 3:
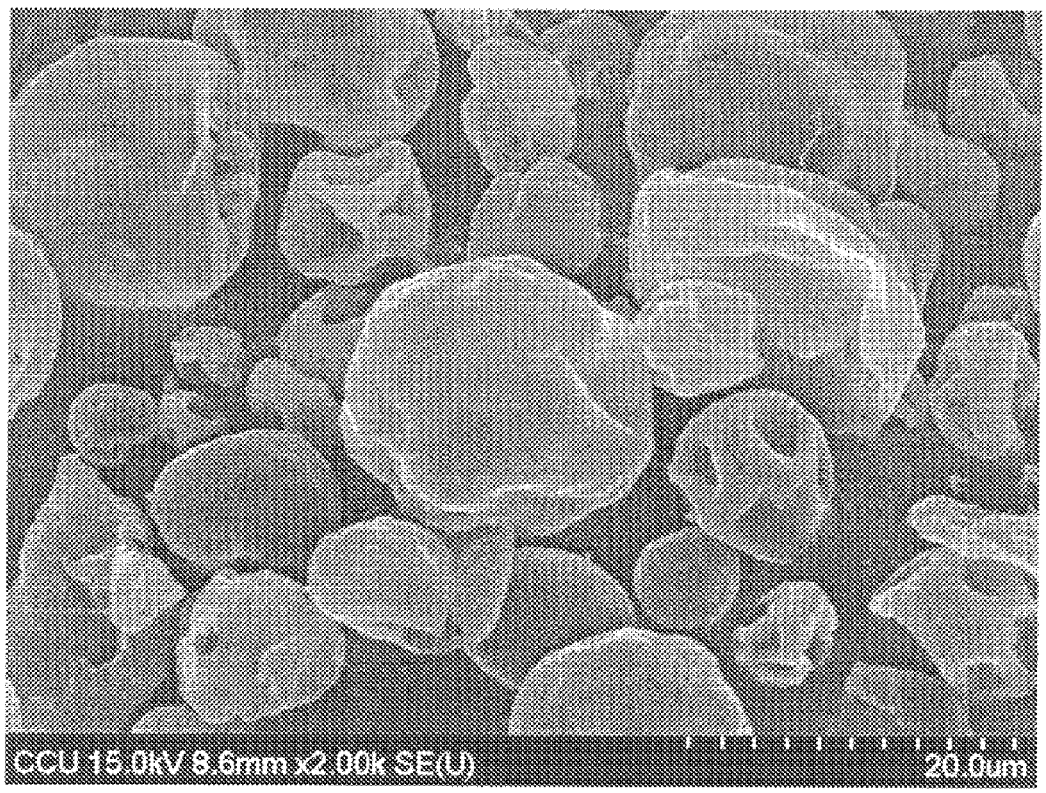
FIG. 3 is a scanning electron microscope image of hydrolyzed starch.

Therefore, by hydrolyzing the raw starch with the acid, the raw starch is eroded, decreased in size, and is provided with a porous roughened surface, as shown in FIG. 3, that is beneficial for compatibility with the plastic material.

The esterification is conducted by adding an esterifying agent, such as an organic acid or an acid anhydride, to a slurry of the hydrolyzed starch. In an embodiment, the esterification is carried out at room temperature, and the pH value of the slurry ranges from 8 to 8.5. A sodium hydroxide solution may be used to control the pH value.

The esterifying agent may be selected from a group consisting of acetic acid, propionic acid, acetic anhydride, propionic anhydride, and phosphoric acid. Preferably, an acid anhydride is used because one acid anhydride molecule can be hydrolyzed into two carboxyl group-containing molecules for reaction with the hydroxyl groups of the hydrolyzed starch during esterification. A better esterification efficiency can thus be achieved. After the esterification is completed, the degree of ester substitution for each esterified starch molecule can achieve 0.5~3. In preferred embodiments, the degree of ester substitution for each esterified starch molecule is at least 0.5~1.5.

After esterification, the hydrolyzed and esterified starch is dried preferably by spray drying. According to a preferred embodiment, the resulting dried modified starch has a size ranging from 10 μm to 50 μm, and a moisture content ranging from 2% to 8%. As the spray-drying method can provide uniform size and uniform moisture content, it is advantageous for the dried modified starch to mix homogeneously with the plastic material. The quality of the final product can thus be enhanced.

In step 102, the dried modified starch is mixed with the plastic material in the presence of an additive component to form a blend. Preferably, the plastic material is an ethylene vinyl acetate (EVA) copolymer. The mixing operation is conducted at an operating temperature ranging from 100° C. to 130° C., and with an operating time ranging from 6 minutes to 15 minutes.

Preferably, the blend comprises 20 to 30 weight parts of the dried modified starch, 60 to 75 weight parts of the EVA copolymer, and 14 to 40 weight parts of the additive component.

In an embodiment, the additive component comprises 10 to 30 weight parts of a filler, 2 to 5 weight parts of a foaming agent, 0.8 to 1.0 weight part of a crosslinking agent, 0.8 to 1.2 weight part of a processing aid and 1 to 2 weight parts of a foaming aid.

Preferably, the filler is selected from a group consisting of calcium carbonate, talcum powder, magnesium carbonate, kaolin and combinations thereof. The crosslinking agent is a peroxide, and preferably, dicumyl peroxide (DCP). The processing aid includes stearic acid. The foaming aid includes zinc oxide powder.

As mentioned above, the hydrolyzed starch has smaller size molecules and porous surfaces which can improve compatibility, and the acid anhydride used in esterification provides more carboxyl groups that provide higher degree of ester substitution. The hydrolyzed and esterified starch is highly compatible with the EVA copolymer which is rich in ester group. Therefore, the combination of the hydrolyzed and esterified starch and the EVA copolymer can have improved physical properties and bonding strength.

In step 103, a plastic material is formed from the blend of the hydrolyzed and esterified starch and the EVA copolymer at an elevated temperature. The plastic material may be in the form of sheets or pellets from which shoe components, such as midsoles and sole pads, may be made. A twin-roller may be used to form the sheets, and a pelletizing machine may be used to form the pellets.

To form the midsoles or sole pads from the sheets, a stack of the sheets having a predetermined weight may be placed in a heated compression mold under predetermined operating conditions (e.g., 165° C.~175° C., 160 kg/cm²~200 kg/cm²) where cross-linking and foaming actions will take place due to the presence of the cross-linking and foaming agents. The product as formed is a foam sheet which may be cut into the shape of the midsole or sole pad by stamping or other suitable processing method.

If the pellets are used to form the midsole or sole pad, the pellets may be melted, foamed, and formed through an injection molding machine operating at suitable conditions, (e.g., 165° C. and 180° C., 160 kg/cm²~200 kg/cm²).

For further illustration of this invention, examples are presented below. It should be noted herein that the examples are only for illustrative purpose and should not be deemed to limit implementation of this invention.

EXAMPLES

(1) Forming Dried Modified Starch

Example (1-1) Hydrolysis 3000 grams of starch and 4500 grams of 1N-hydrochloric acid were mixed to form a 40% w/w starch slurry, and then placed in a hot water bath for hydrolysis. The temperature of the water bath was controlled at 50° C. The reaction time for hydrolysis was about 1 hour, and the reaction proceeded under constant stirring. When the predetermined reaction time was reached, 1N sodium hydroxide solution was added to adjust the pH of the reacting solution to 5.5 and to terminate the hydrolysis reaction.

Thereafter, the hydrolyzed starch slurry was kept still, so that the hydrolyzed starch precipitated. The resulting precipitate was washed and then adjusted to a concentration of 40% w/w for subsequent esterification reaction.

Example (1-2) Esterification 3000 grams of acetic anhydride was slowly added dropwise to the hydrolyzed starch slurry. At the same time, a 6N sodium hydroxide solution was slowly added to control the pH value of the slurry to a range of 8~8.5. Esterification was carried out under constant stirring. The temperature for the reaction was kept at room temperature through a hot water bath. After all acetic anhydride was added, the reaction was completed. Thereafter, the starch slurry was kept still and precipitated. The resulting precipitate was washed and adjusted to a concentration of 10% w/w.

Example (1-3) Spray Drying

For spray drying, the hydrolyzed and esterified starch slurry was atomized into a high temperature dryer at a rate of 0.5 to 1.5 liter/hour via a two-phase nozzle. The temperature at an air inlet of the dryer was 170 to 210° C. and that at an air outlet was 70° C. to 110° C. The micro-liquid droplets of the atomized starch slurry vaporized due to heat in the dryer, thereby forming powder particles. The dried powder particles were collected using a cyclone separator. A dried modified starch was thus obtained.

Example (2)

Mixing and Forming the Biodegradable Plastic Material 1000 grams of the dried modified starch, 2300 grams of EVA granules, 495 grams of talcum powder, 99 grams of a foaming agent (Azotype), 33 grams of a crosslinking agent (DCP), 33 grams of stearic acid (processing aid and release agent) and 66 grams of a zinc oxide powder were mixed in a mixer. When the temperature in the mixer increased to about 120° C., the mixing operation already went on for 6 to 15 minutes, and a completely melt homogeneous blend resulted. The blend was then formed into the biodegradable plastic material in the form of sheets through a twin-roller.

A stack of the sheets with a suitable weight was placed into a preheated compression mold (usually preheated to about 165° C.) and was heated for 20~30 minutes at a temperature of 165° C.±2° C. and a pressure ranging between 160 kg/cm² and 200 kg/cm² to undergo crosslinking and foaming. The resulting crosslinked and foamed sheet may be used as a shoe material from which midsoles or sole pads may be formed such as by stamping.

Testing Physical Properties

Various physical properties of the biodegradable plastic material were examined through standard test methods. The results are shown in Table 1.

TABLE 1

| Test Item | Test result | Testing Standard |
| --- | --- | --- |
| Hardness (type C) | 54~55 | ASTM D2240 |
| Specific gravity | 0.1972 | ASTM D297 |
| Tensile strength (kg/cm²) | 20.5 | ASTM D412 |
| Elongation (%) | 204.0 | ASTM D412 |
| Tear strength (kg/cm) | 7.50 | ASTM D624 |
| Rebound (%) | 47 | ASTM D2632 |
| Compression set | 50.80 | ASTM D395 |

The results in Table 1 show that the biodegradable plastic material possesses good mechanical properties which meet the standards for shoes. The results are due to the high compatibility of the hydrolyzed and esterified starch with the EVA copolymer. Furthermore, because of high compatibility between the hydrolyzed and esterified starch and the EVA copolymer, the proportion of the hydrolyzed and esterified starch in admixture with the EVA copolymer can be increased, thereby lowering the proportion of the EVA copolymer and improving the biodegradable properties of the biodegradable plastic material.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for producing a biodegradable plastic material comprising:
    hydrolyzing starch to form a hydrolyzed starch;
    esterifying the hydrolyzed starch to form a hydrolyzed and esterified starch;
    drying the hydrolyzed and esterified starch to obtain a dried modified starch; and
    mixing the dried modified starch with a plastic material;
    wherein an esterifying agent selected from the group consisting of an organic acid, an acid anhydride, and phosphoric acid is added in the esterification of the hydrolyzed starch.

2. The method of claim 1, wherein the plastic material includes an ethylene vinyl acetate copolymer.

3. The method of claim 2, wherein the hydrolyzed starch has a number average molecular weight ranging between $10^4$ and $10^7$.

4. The method of claim 3, wherein an inorganic acid is added to hydrolyze the starch, and an alkaline solution is added to terminate the hydrolysis of the starch so that the hydrolyzed starch has a predetermined number average molecular weight.

5. The method of claim 4, wherein the inorganic acid is selected from the group consisting of hydrochloric acid, nitric acid, sulfuric acid and phosphoric acid.

6. The method of claim 1, wherein the dried modified starch has a particle size ranging from 10 µm to 50 µm.

7. The method of claim 6, wherein the dried modified starch has a moisture content of 2% to 8% by weight.

8. The method of claim 1, wherein 20 to 30 weight parts of the dried modified starch is mixed with 60 to 75 weight parts of the plastic material and 14 to 40 weight parts of an additive component to form a blend.

9. The method of claim 8, wherein the additive component includes a filler, a cross-linking agent, a foaming agent, a processing aid and a foaming aid.

10. The method of claim 1, wherein acetic anhydride is added in the esterification of the hydrolyzed starch.

11. The method of claim 1, wherein the degree of ester substitution of the hydrolyzed and esterified starch ranges from 0.5 to 3.

12. The method of claim 1, wherein the degree of ester substitution of the hydrolyzed and esterified starch ranges from 0.5 to 1.5.

13. The method of claim 1, wherein the hydrolyzed and esterified starch is dried by spray drying.

14. The method of claim 1, further comprising the steps of forming the blend into a foam sheet, and forming a shoe sole from the foam sheet.

15. A biodegradable plastic material comprising a modified starch and a plastic material, the modified starch being produced by:
    hydrolyzing starch to form a hydrolyzed starch;
    esterifying the hydrolyzed starch to form a hydrolyzed and esterified starch; and
    drying the hydrolyzed and esterified starch to obtain the modified starch;
    wherein an esterifying agent selected from the group consisting of an organic acid, an acid anhydride, and phosphoric acid is added in the esterification of the hydrolyzed starch.

16. The biodegradable plastic material of claim 15, wherein the plastic material is an ethylene vinyl acetate copolymer.

17. The biodegradable plastic material of claim 16, which comprises 20 to 30 weight parts of the modified starch, and 60 to 75 weight parts of the ethylene vinyl acetate copolymer.

18. The biodegradable plastic material of claim 17, which further comprises 14 to 40 weight parts of an additive component, the additive component including a filler, a crosslinking agent, a foaming agent, a processing aid and a foaming aid.

19. A method for producing a biodegradable plastic material comprising:
    hydrolyzing starch to form a hydrolyzed starch;
    esterifying the hydrolyzed starch to form a hydrolyzed and esterified starch;
    drying the hydrolyzed and esterified starch to obtain a dried modified starch; and
    mixing the dried modified starch with a plastic material;
    wherein an inorganic acid is added to hydrolyze the starch, and an alkaline solution is added to terminate the hydrolysis of the starch so that the hydrolyzed starch has a predetermined number average molecular weight.

* * * * *